July 24, 1956
A. J. FIPPARD
2,755,901
FRICTION CLUTCHES, FLUID OPERATED
Filed Nov. 6, 1953
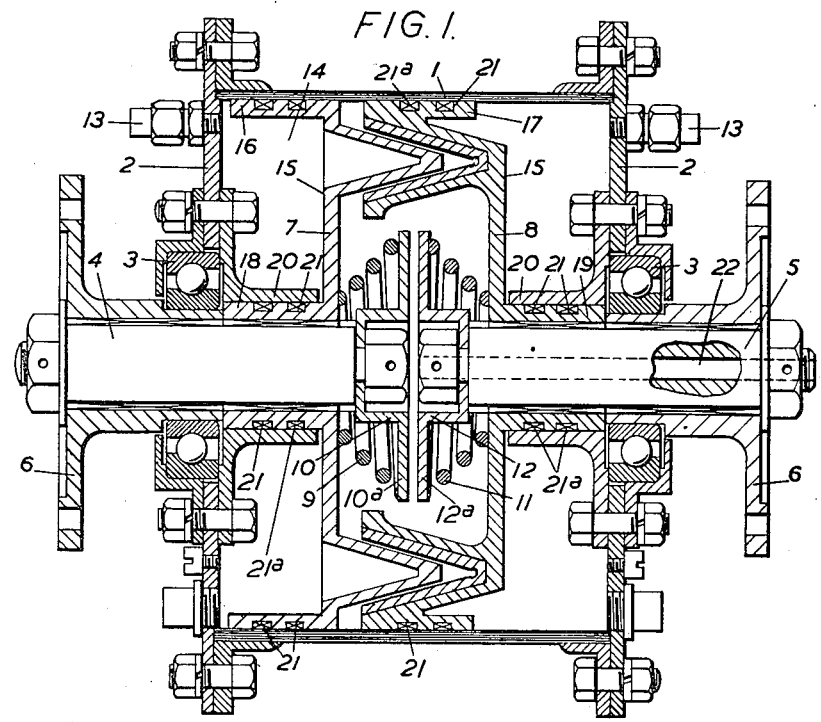
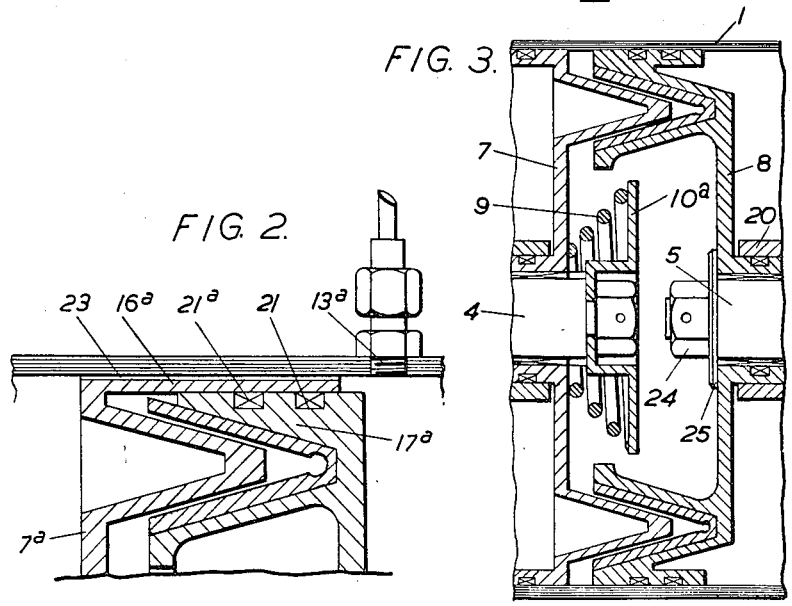
Inventor
ARTHUR JOHN FIPPARD

United States Patent Office 2,755,901
Patented July 24, 1956

2,755,901
FRICTION CLUTCHES, FLUID OPERATED

Arthur John Fippard, Bournemouth, England

Application November 6, 1953, Serial No. 390,698

Claims priority, application Great Britain November 25, 1952

17 Claims. (Cl. 192—85)

This invention has reference to improvements in and relating to friction clutches comprising a driving member and a driven member adapted to be coupled together by the action of fluid under pressure, i. e., compressed air or liquid under pressure, either or both of said members being axially movable to enable the fluid when applied under pressure to close the clutch.

The principal object of the invention is the provision of a pressure-fluid operated friction clutch wherein end thrust on the supporting shafts of the clutch members is eliminated or substantially so.

In accordance with the invention the clutch members are arranged in a fluid chamber, the chamber is arranged to receive pressure-fluid so that the fluid acts on the back faces of the clutch members when the clutch is to be held closed, means is provided adapted substantially to isolate the opposite or inner faces of the clutch members from the pressure fluid and the areas of these members on which the fluid thrusts in a direction parallel to the clutch axis are substantially equal, whereby the said members are thrust towards each other by the pressure fluid with substantially the same pressure so that end thrust on the shafts supporting the said members is eliminated or substantially so.

A suitable arrangement incorporating the invention is one wherein the clutch members move backward or forward on their respective shafts on splining but it is to be understood that one member may be fixed to or form part of its shaft, the shaft to which the other clutch member is fixed being non-slidable.

In the preferred way of carrying out the invention the two clutch members are preferably fitted to their respective shafts by splining or its equivalent and are contained in a suitable chamber the interior of which chamber is circular. The periphery of each clutch member is a close fit within the circular interior of the said chamber, or the clutch members carry peripheral sealing rings, so that between each clutch member and its respective chamber end cover pressure fluid may be locked or released whilst the opposite or inner faces of the said members are isolated from the fluid. The shafts fitted in the clutch members pass through the end covers of the said chamber and are provided where they so pass through with means to prevent the escape of pressure fluid. When pressure fluid, usually compressed air, is admitted between the clutch members and the end covers of the said chamber the clutch members are driven towards each other and engagement takes place. Disengagement when the compressed air is released can be effected by means of a spring or springs which drive the two members apart. Compressed air can be admitted at suitable positions in the said chamber and means for releasing the air to atmosphere can be provided.

In practice, air above atmospheric pressure will through the medium of a suitable valve admit compressed air between the end covers of the said chamber and each clutch member when engagement is needed and will release the compressed air to atmosphere when disengagement is needed.

The clutch members revolve in the said chamber but their peripheries need not be completely air tight in relation to the chamber so long as they are sufficiently air tight to ensure that air can drive the members together, for when the faces of the engaging members and clutch plates if the latter are interposed are brought together by sufficient pressure the friction surfaces of the opposite or inner faces of the members will prevent air above atmospheric pressure being locked between the said faces and tending to drive them apart. To prevent appreciable pressure being locked between the faces of the two clutch members an outlet to atmosphere may be provided through one or both shafts.

As the pressure between the chamber end covers and the backs of the clutch members is alike for both members the pressure driving them together may be high without end thrust being set up on either shaft. For instance, with a pressure of 50 pounds per square inch and an effective area equivalent to five inches square per clutch member the pressure driving the two clutch members together with be 5″×5″=25″×50 lbs.=1250 lbs. for the two members minus the counterpressure of the springs.

Examples of construction of clutches according to the invention will now be described with reference to the accompanying drawings wherein:

Fig. 1 is a sectional elevation of a clutch showing skirts on both clutch elements provided with sealing rings which engage the inner periphery of the clutch case;

Fig. 2 is a sectional elevation of a detail wherein skirts on the clutch elements are needed and sealing rings are carried by one of the skirts; and Fig. 3 is a sectional elevation of a modification wherein a single spring separates the clutch members relatively.

The clutch shown in Fig. 1 comprises a hollow cylindrical case 1 having end plates 2 detachably secured to it. Bearings 3 carried by the end plates support shafts 4 and 5, respectively, co-axially of the case 1, said shafts extending into the case and extending beyond the end plates. Coupling elements 6 are fixed to the outer ends of the shafts by splines. Clutch members 7 and 8 are mounted co-axially to the case 1 on those parts of the shafts within the case; the shafts are splined so that the said members can slide on them axially but neither can rotate relatively to the shaft bearing it.

A spring 9 compressed between the clutch member 7 and a counterthrust element in the form of a flange 10a of the flanged cup 10 on the shaft 4 tends to thrust the member 7 towards the left hand end of the case and a similar compressed spring 11 between the member 8 and a counterthrust element in the form of a flange 12a of a flanged cup 12 on the inner end of the shaft 5 tends to thrust the member 8 towards the right hand end of the case. The springs, therefore, tend to separate the clutch members 7 and 8.

The fluid introduced into the chamber 14 is at the same pressure at both ends of the chamber and the areas of the back faces 15 of the clutch members on which the fluid presses in the axial direction are about equal. Hence end thrust on the shafts 4 and 5 is substantially eliminated.

In order to isolate the opposite or inner faces of the clutch members from the pressure fluid and to prevent unwanted escape of the pressure fluid from the chamber 14 sealing means are located between the clutch members and the case 1 and between the said members and the end plates. To provide such sealing means the clutch members 7 and 8 have skirts 16 and 17 respectively which have a tolerance fit against the inner periphery of the case 1, the said members have central bosses 18 and 19 respectively which are nested with a tolerance fit in hollow bosses 20 secured to the end plates on the inner sides of the latter, and in the skirts 16 and 17 and in the bosses 18 and 19 are grooves 21 containing packing rings 21a. A vent 22 in the shaft 5 permits air freely to enter and to leave the space between the clutch members.

When it is desired to close the clutch fluid under pressure is introduced through connectors 13 on the end plates into the ends of the chamber 14 formed by the case 1 and the end plates 2. This fluid acts on the back faces 15 of the clutch members to press the inner faces of said members together against the opposition of the springs 9 and 11. Thus the clutch is closed. When the pressure is released the springs separate the clutch members.

It will be understood that the clutch members and their shafts rotate, whilst the casing and parts fixed to it are stationary, the packing rings 21a making rubbing contact with the stationary parts surrounding them.

In a modification the skirts 16 and 17 may be nested and one of the skirts is grooved and the grooves contain packing rings. In such an arrangement one connector such as 13 is sufficient for supplying air to both ends of the chamber 14. The frictional loss in the clutch is less since there need be no rubbing contact with the case 1. This modification is illustrated in Fig. 2. The nested skirts are indicated by 16a and 17a respectively; the inner skirt is grooved at 21 and packing or sealing rings 21a are located in the grooves. The outer skirt 16a has a tolerance fit in the case 1; and in order to permit of the free passage of air to (and from) the back face of the member 7a, said air entering the case (and exhausting from it) through the single connector 13a, the skirt 16a is longitudinally grooved at 23.

In another modification, either of the clutch members may be fixed to its shaft in non-slidable relation, sliding movement of the other element being all that is necessary to ensure relative movement of the clutch elements towards and away from each other.

An example of such a modification, applied to the clutch of Fig. 1 but equally applicable to the clutch of Fig. 2 is shown in Fig. 3.

In Fig. 3 the clutch member 8 is fixed to its shaft 5 by the securing nut 24 and washer 25, relative separation of the clutch members 8 and 7 being effected by the spring 9 when the fluid pressure is released.

What I claim is:

1. A pressure-fluid operated friction clutch comprising a case, said case being closed at its ends, two clutch members within said case, at least one of said clutch members being relatively movable in an axial direction, shafts on which said clutch members are mounted, said shafts extending through the closed ends of the case, means for introducing pressure fluid into the interior of the case and means for isolating from between said members the pressure fluid so introduced into the case, said pressure fluid thus urging the clutch members into relatively engaging condition by pressure acting in the axial directions of the clutch members, the areas of the respective clutch members on which the fluid presses in the axial direction being substantially equal.

2. A pressure-fluid operated friction clutch according to claim 1, said clutch members being slidably mounted on their respective shafts in non-rotatable relation to said shafts.

3. A pressure-fluid operated friction clutch according to claim 1, one of said clutch members being slidably mounted on its shaft in non-rotatable relation thereto and the other clutch member being fixed to its shaft.

4. A pressure-fluid operated friction clutch according to claim 1, comprising end plates closing the ends of the case and sealing means between the end plates and the clutch members for preventing the egress of pressure fluid from the case, said sealing means surrounding said shafts within the case.

5. A pressure-fluid operated friction clutch according to claim 1, said case being of hollow cylindrical form and said pressure-fluid isolating means comprising skirts around said clutch members and sealing rings between said skirts and the inner periphery of said case.

6. A pressure-fluid operated friction clutch according to claim 1, said case being of hollow cylindrical form and said pressure-fluid isolating means comprising a cylindrical skirt around one of said clutch members and a cylindrical part around the other clutch member, said cylindrical part being nested in said skirt, and sealing rings between said skirt and cylindrical part.

7. A pressure-fluid operated friction clutch according to claim 1, comprising end plates closing the ends of the case and sealing means between the end plates and the clutch members for preventing the egress of pressure fluid from the case, said sealing means comprising a hollow boss on each end plate, a hollow boss on each clutch member, the boss on one clutch member and a boss on one end plate being nested one in the other and the boss on the other clutch member and the boss on the other end plate being nested one in the other, said bosses surrounding the respective shafts, and a sealing ring between each inner boss and the boss in which it is nested.

8. A pressure-fluid operated friction clutch according to claim 1, comprising spring means urging the clutch members relatively apart.

9. A pressure-fluid operated friction clutch according to claim 1, said clutch members being slidably mounted on their respective shafts in non-rotatable relation to said shafts, springs between the clutch members and two counterthrust elements between the clutch members, one counterthrust element being mounted on the shaft of one clutch member and the other counterthrust element being mounted on the shaft of the other clutch member and said springs being compressed between the clutch members and the counterthrust elements mounted on the respective shafts of the clutch members.

10. A pressure-fluid operated friction clutch according to claim 1, one of said clutch members being slidably mounted on its shaft in non-rotatable relation thereto and the other clutch member being fixed to its shaft, a counterthrust element mounted on the shaft of the slidable clutch member and a spring compressed between said slidable clutch member and said counterthrust element.

11. A pressure-fluid operated friction clutch comprising a hollow cylindrical case, end plates mounted on said case, a clutch shaft supported co-axially of the case by a bearing mounted on one end plate and a second clutch shaft supported co-axially of the case by a bearing mounted on the other end plate, said shafts extending into the interior of the case and projecting outwardly of the end plates, a circular clutch member within the case slidably mounted on splines on one of the shafts and an opposite circular clutch member within the case slidably mounted on splines on the other shaft, sealing means comprising sealing rings between the peripheral parts of the clutch members and the inner periphery of the case and sealing means comprising sealing rings between the clutch members and the end plates, spring means tending to urge the clutch members away from each other, and means for introducing pressure-fluid into the ends of the case, such fluid thrusting against the back faces of the clutch memmembers so as to urge each member towards the other to close the clutch in opposition to the spring means and the areas of the clutch members on which the pressure-fluid thrusts in a direction parallel to the clutch axis being substantially equal.

12. A pressure-fluid operated friction clutch comprising a hollow cylindrical case, end plates mounted on said case, a clutch shaft supported co-axially of the case by a bearing mounted on one end plate and a second clutch shaft supported co-axially of the case by a bearing mounted on the other end plate, said shafts extending into the interior of the case and projecting outwardly of the end plates, a circular clutch member within the case slidably mounted on splines on one of the shafts and an opposite circular clutch member within the case slidably mounted on splines on the other shaft, a cylindrical skirt at the periphery of the first clutch member and a cylindrical part at the periphery of the second clutch member, said cylindrical part being nested in said skirt, a sealing ring between said cylindrical part and said skirt, and sealing means comprising sealing rings between the clutch members and the end plates, spring means tending to separate the cluch members relatively, and means for introducing pressure-fluid into the ends of the case, such fluid thrusting against the back faces of the clutch members so as to urge each member towards the other to close the clutch in opposition to the spring means and the areas of the clutch members on which the pressure-fluid thrusts in a direction parallel to the clutch axis being substantially equal.

13. A pressure-fluid operated friction clutch comprising a hollow cylindrical case, end plates mounted on said case, a clutch shaft supported co-axially of the case by a bearing mounted on one end plate and a second clutch shaft supported co-axially of the case by a bearing mounted on the other end plate, said shafts extending into the interior of the case and projecting outwardly of the end plates, a circular clutch member within the case slidably mounted on splines on one of the shafts and an opposite circular clutch member within the case fixedly mounted on the other shaft, sealing means comprising sealing rings between the peripheral parts of the clutch members and the inner periphery of the case and sealing means comprising sealing rings between the clutch members and the end plates, spring means tending to urge the clutch members away from each other, and means for introducing pressure-fluid into the ends of the case, such fluid thrusting against the back faces of the clutch members so as to urge each member towards the other to close the clutch in opposition to the spring means and the areas of the clutch members on which the pressure-fluid thrusts in a direction parallel to the clutch axis being substantially equal.

14. A pressure-fluid operated friction clutch comprising a hollow cylindrical case, end plates mounted on said case, a clutch shaft supported co-axially of the case by a bearing mounted on one end plate and a second clutch shaft supported co-axially of the case by a bearing mounted on the other end plate, said shafts extending into the interior of the case and projecting outwardly of the end plates, a circular clutch member within the case slidably mounted on splines on one of the shafts and an opposite circular clutch member within the case fixedly mounted on the other shaft, a cylindrical skirt at the periphery of the first clutch member and a cylindrical part at the periphery of the second clutch member, said cylindrical part being nested in said skirt, a sealing ring between said cylindrical part and said skirt, and sealing means comprising sealing rings between the clutch members and the end plates, spring means tending to separate the clutch members relatively, and means for introducing pressure-fluid into the ends of the case, such fluid thrusting against the back faces of the clutch members so as to urge each member towards the other to close the clutch in opposition to the spring means and the areas of the clutch members on which the pressure-fluid thrusts in a direction parallel to the clutch axis being substantially equal.

15. A pressure-fluid operated friction clutch according to claim 1 provided with an exhaust duct, said exhaust duct communicating with the space between said clutch members, for the outflow from said space of such fluid as enters it.

16. A pressure-fluid operated friction clutch according to claim 1, said case being cylindrical and said clutch members having circular peripheries, said peripheries being in close proximity to the inner cylindrical surface of said case.

17. A pressure-fluid operated friction clutch according to claim 1, said case being of hollow cylindrical form and said pressure-fluid isolating means comprising a cylindrical skirt around one of said clutch members and a cylindrical part around the other clutch member, said cylindrical part being nested in said skirt, and a sealing ring between said skirt and cylindrical part, the periphery of said cylindrical skirt being in close proximity to the inner cylindrical surface of said case and said skirt having longitudinal grooves.

References Cited in the file of this patent

UNITED STATES PATENTS

| 2,330,024 | Beardsley | Sept. 21, 1943 |

FOREIGN PATENTS

| 958,379 | France | Mar. 8, 1950 |